Jan. 30, 1962 J. M. STAHLY 3,019,054
SIDE DELIVERY DUMP CART
Filed April 18, 1958 2 Sheets-Sheet 2

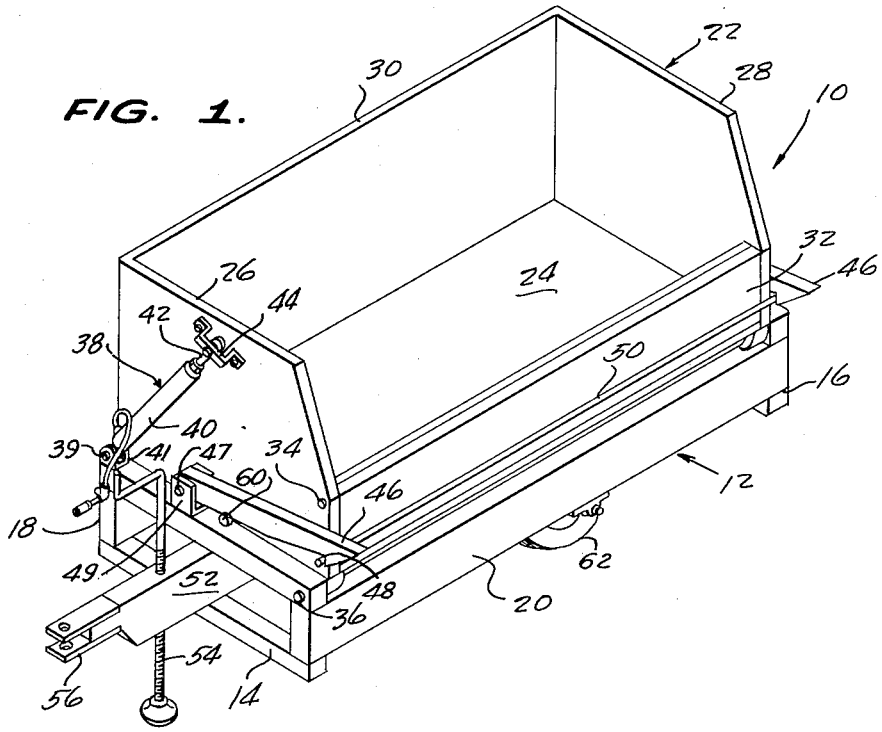

INVENTOR.
JOHN M. STAHLY,
BY
McMorrow, Berman & Davidson
ATTORNEYS

United States Patent Office 3,019,054
Patented Jan. 30, 1962

3,019,054
SIDE DELIVERY DUMP CART
John M. Stahly, 1304 Elm St., Atlantic, Iowa
Filed Apr. 18, 1958, Ser. No. 729,395
1 Claim. (Cl. 298—18)

The present invention relates to a dump cart generally, and in particular to a side delivery dump cart.

An object of the present invention is to provide a dump cart which lends itself to efficient operation in a graveyard, one which loaded with earth dug from a grave site may be readily towed behind a tractor or other vehicle to a position remote and unobservable from the grave site, and after the burial service, may be readily returned to the grave site and easily unloaded to refill the grave opening.

Another object of the present invention is to provide a side delivery dump cart which is simple in structure, one sturdy in construction, one which is operable by the hydraulic pump mechanism of a tractor to unload, and one which is economically feasible.

Figure 3:
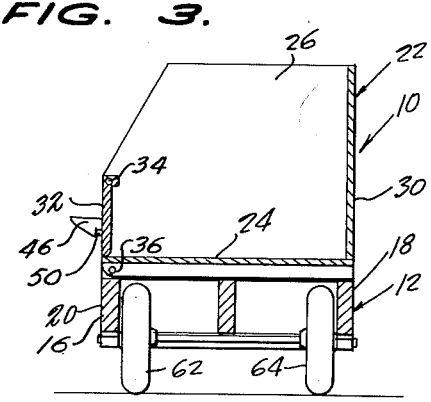
Figure 4:
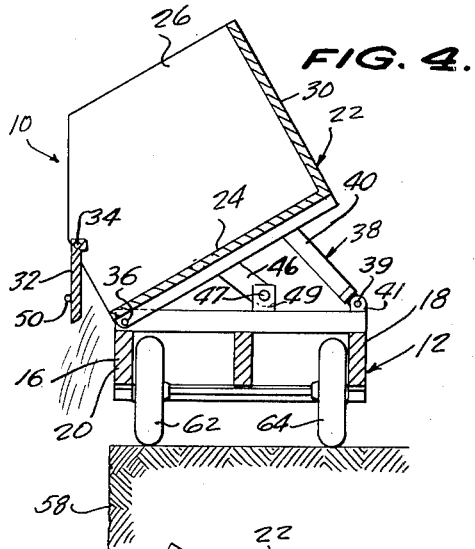
Figure 5:
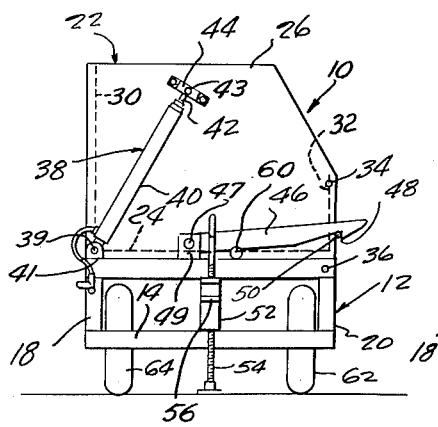
Figure 6:
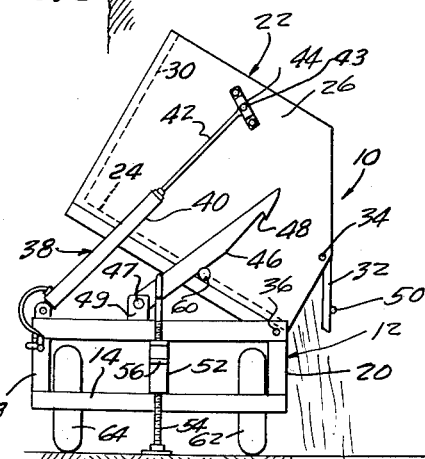

These and other objects and advantages of the present invention will be fully apparent from the following description when taken in conjunction with the annexed drawings, in which:

FIGURE 1 is an isometric view of the dump cart according to the present invention, FIGURE 2 is an elevational view of the assembly shown in FIGURE 1, FIGURE 3 is a view taken on the line 3—3 of FIGURE 2, FIGURE 4 is a view similar to FIGURE 3 showing the dump body in position for unloading, FIGURE 5 is an elevational view taken from the other end of the view shown in FIGURE 3, and FIGURE 6 is an elevational view taken from the other end of the view shown in FIGURE 4.

Referring in greater detail to the drawings in which like numerals indicate like parts throughout the several views, the side delivery dump cart of the present invention is designated generally by the reference numeral 10 and comprises a horizontally disposed mobile frame 12 having a forward end 14, a rearward end 16, and sides 18 and 20.

The dump cart 10 includes a body 22 having a bottom 24, end walls 26 and 28 rising from the bottom 24, a rear wall 30 extending between one of the adjacent ends of the end walls 26 and 28, and a shallow vertical gate member 32 bridging the portions of the complemental other ends of the end walls 26 and 28.

The rear wall 30 of the body 22 is of the same height as the end walls 26 and 28, each of the end walls 26 and 28 having a sloping surface beginning at a point above the bottom 24 of the dump body 22 and ending in the top portion of the end wall spaced from the rear wall 30 of the dump body 22. The shallow gate member 32 bridges the portions of the end walls below the terminating points of the sloping portions of the end walls 26 and 28.

The dump body 22 is positioned upon the cart frame 12 so that the bottom 24 is normally horizontally disposed upon the frame 12 and the end walls 26 and 28 are adjacent the forward end 14 and rearward end 16, respectively, of the frame 12.

The rear wall 30 of the body 22 is adjacent the frame side 18 and the gate member 32 is adjacent the frame side 20.

A hinge pin 34 projects from each end of the gate member 32 adjacent the top thereof and extends through appropriately aligned holes provided in the dump body end walls 26 and 28 and connects the gate member 32 to the dump body end walls 26 and 28 for swinging movement from a vertical position to a position swung away from the body 22, opening the body 22 for dumping of material piled therein on the bottom 24, as shown in FIGURES 4 and 6.

The dump body 22 is connected along the gate member 32 by other hinge pins 36 which are carried by the bottom 24 of the body 22 and extend through the frame ends 14 and 16 for movement of the dump body 22 from the position in which the dump body bottom 24 is horizontally disposed to a tilted position in which the bottom 24 is at an angle with respect to the frame 12, also as shown in FIGURES 4 and 6.

Means is provided operatively connected to the dump body 22 for effecting the movement of the latter from the position in which the bottom 24 is horizontal to the position in which the bottom 24 is tilted. Specifically, this means consists in a hydraulic cylinder assembly 38 mounted upon each end of the cart 10 with the cylinder 40 of each assembly 38 pivotally secured by a pin 39 received in a bracket 41 attached to the adjacent portion of the forward and rearward ends 14 and 16 of the frame 12 adjacent the side 18 and with the free end of the actuating arm 42 of each assembly 38 pivotally mounted on a pin 43 received in a U-shaped bracket 44 secured to the exterior face of the body end walls 26 and 28, respectively.

An arm 46 has one end pivotally connected by a pin 47 received in a bracket 49 secured to each of the frame forward and rearward ends 14 and 16 intermediate the sides 18 and 20 for swinging movement about a horizontal axis, and the free end of each arm 46 having a hook 48 normally engaging a latch pin 50 which extends along the exterior face of the gate member 32 intermediate the top and bottom and has portions adjacent each end projecting beyond the adjacent dump body end walls 26 and 28, the hooks 48 engaging such portions when the dump body is in the position with the body bottom 24 horizontally disposed. A tongue 52 projects from the forward end 14 of the frame 12 intermediate the sides 18 and 20 and a vertically disposed hand operable screw 54, constituting a supporting member, extends through a vertically disposed threaded bore provided in the tongue 52 intermediate the ends thereof for holding the frame 12 in the horizontal position when the hitch 56 on the free end of the tongue 52 is disconnected from a towing vehicle.

In use, the sloping surfaces of the body end walls 26 and 28 and the unobstructed part above the gate member 32 provides a shoveling space for loading dirt into the body 22 as dirt or earth is dug from a grave opening, as at 58 in FIGURES 4 and 6. After sufficient earth has been taken from the opening 58 the cart of the present invention may be towed behind a towing vehicle to a remote and unobservable location, with reference to individuals standing by the grave site, and after a burial service has been performed and the casket lowered into the grave opening, the cart 10 is readily returned to the site of the grave opening and with the hydraulic cylinder assembly connected to the hydraulic fluid pump of the tractor or other vehicle, the body 22 is tilted to the position in which the bottom 24 slopes upwardly and the gate member 32 is automatically released from its locked position by means of a pin 60 carried on each of the body end walls 26 and 28 and engageable on the under sides of the arms 46 for raising them from the latched position to an unlatched position, as shown most clearly in FIGURE 6.

The cart 10 of the present invention is supported upon a pair of wheels 62 and 64, making the cart highly maneuverable and permitting its positioning close to the side of the grave opening 58. When the towing vehicle is removed the screw 54 is extended downwardly, so as to support the tongue 52 and keep the body bottom 24 in the horizontal position.

What is claimed is:

A dump cart comprising a horizontally disposed frame having a forward end, a rearward end, and a pair of sides, a dump body including a bottom, a pair of end walls rising from the bottom, a rear wall extending between one of the adjacent ends of said end walls, said rear wall being of the same height as end walls, each of said end walls having a sloping surface beginning at a point spaced above the bottom of said dump body and ending in the top portion of the end wall spaced from the rear wall of said dump body, a shallow vertical gate member bridging the portion of the complemental other ends of said end walls below said points, means connecting the upper end of said gate member to said end walls for swinging movement of said gate member from the vertical position to a position swung away from said body, the sloping surfaces of said end walls and the unobstructed part above said gate member providing a shoveling space for loading said dump body, said dump body being positioned upon said frame so that the bottom is horizontally disposed upon said frame with the end walls adjacent the forward and rearward ends respectively of said frame, the rear wall adjacent one of the sides of the frame, and the gate member and sloping surfaces of the end walls adjacent the other of the sides of said frame, means pivotally connecting said dump body adjacent and extending along said gate member to said frame for movement of said body from the position in which said bottom is horizontally disposed to a tilted position in which said bottom is at an angle with respect to said frame, a pivot pin extending along and carried by the side of said frame opposite said gate member, a hydraulic cylinder assembly positioned contiguous to and along each of said end walls and having one end pivotally connected to said pivot pin, and an actuating arm extending out of the other end of each of said assemblies and fixedly attached to the adjacent end wall, a latch pin extending along said gate member intermediate the upper and lower ends and having end portions projecting from the opposite ends of said gate member, and latch arm pivotally connected to the forward and rearward ends of said frame and releasably engageable with the adjacent projecting end portion of said latch pin for holding the gate member in the vertical position.

References Cited in the file of this patent

UNITED STATES PATENTS

| | | |
|---|---|---|
| 1,210,867 | Starner | Jan. 2, 1917 |
| 1,278,725 | Nicks | Sept. 10, 1918 |
| 1,894,320 | Muchenberger-Wittlinger | Jan. 17, 1933 |
| 2,071,796 | Ingwarsson | Feb. 23, 1937 |
| 2,072,998 | Allin | Mar. 9, 1937 |
| 2,437,890 | Orendorff | Mar. 16, 1948 |
| 2,823,817 | Holsclaw | Feb. 18, 1958 |

FOREIGN PATENTS

| | | |
|---|---|---|
| 587,740 | Great Britain | May 5, 1947 |
| 256,870 | Italy | July 23, 1928 |